March 21, 1944.                W. E. AGER                2,344,913
                                 VALVE
                          Filed April 16, 1942
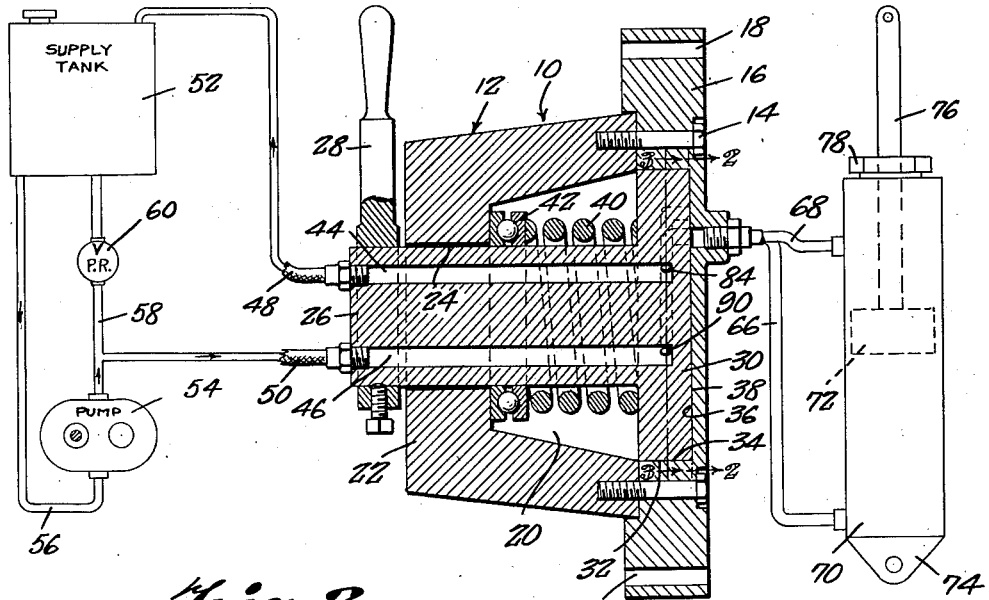
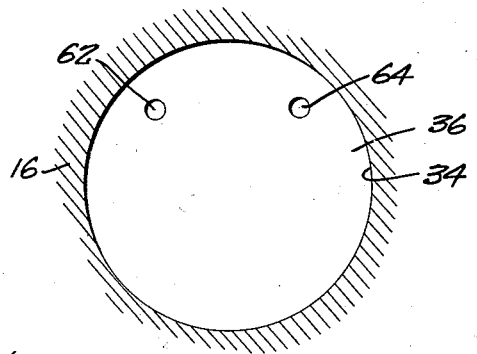
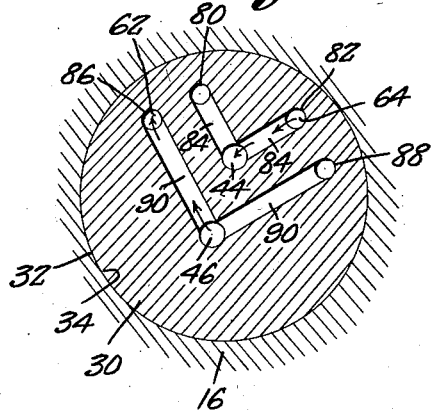
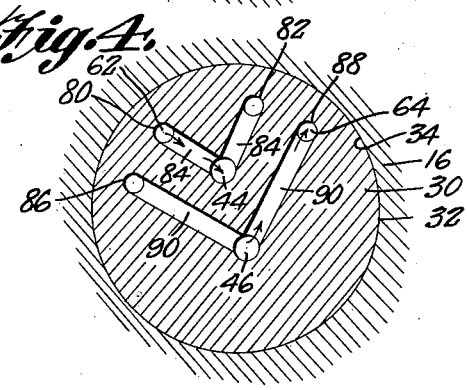
William E. Ager,
INVENTOR.
BY
Victor J. Evans & Co.
ATTORNEYS Patented Mar. 21, 1944

2,344,913

UNITED STATES PATENT OFFICE 2,344,913

VALVE

William E. Ager, Bristol, Va.

Application April 16, 1942, Serial No. 439,256

6 Claims. (Cl. 251—87)

My invention relates to power devices, and has among its objects and advantages the provision of an improved valve particularly well adapted for hoist, feeding purposes and the like.

In the accompanying drawing:

Figure 1 is a schematic illustration partly in section of my invention;

Figure 2 is a sectional view taken along the line 2—2 of Figure 1;

Figure 3 is a sectional view taken along the line 3—3 of Figure 1; and

Figure 4 is a view similar to Figure 3 but illustrating the control valve in a different position.

In the embodiment of my invention selected for illustration, I make use of a valve unit 10 having a body 12 bolted at 14 to a plate 16 provided with openings 18 for the reception of bolts to secure the valve unit to a suitable support. The body 12 is provided with a chamber 20 closed by the plate 16. The wall 22 of the body 12 is provided with a bore 24 for rotatably supporting a valve shaft 26 having one end extending exteriorly of the body 12 to serve as a mount for an adjusting handle 28.

To the inner end of the shaft 26 is fixedly secured a disk or plate 30 of circular formation and having its peripheral face 32 fitting snugly but rotatably against the face 34 of a bore 36 in the inner face of the plate 16. The face 38 of the plate 30 is pressed against the bottom face of the bore 36 and is held firmly thereagainst by a compression spring 40 interposed between the plate and a thrust bearing 42 lying against the wall 22.

The shaft 26 is provided with two axial bores 44 and 46 respectively communicating with flexible lines 48 and 50. The line 48 communicates with the upper end of an oil supply tank 52 and the line 50 communicates with a pump 54 having an inlet pipe 56 communicating with the bottom of the supply tank 52. A branch pipe 58 places the pump 54 in communication with the supply tank 52, the pipe 58 being provided with a pressure relief valve 60.

Two openings 62 and 64 are provided in the plate 16 inside the diameter of the bore 34. A flexible hose 66 has one end attached to the plate 16 for communication with the opening 62 and a second flexible hose 68 has one end connected with the plate 16 for communication with the opening 64. The other end of the hose 66 has communication with the bottom end of a work cylinder 70 having a piston 72 slidable therein, while the other end of the hose 68 has communication with the cylinder 70 near its upper end and above the piston 72 in all positions of the latter. A flange 74 is provided at the lower end of the cylinder 70 for pivotal connection with a suitable support, while a rod 76 is connected with the piston 72 and extends through a packing nut 78 for connection with devices to be operated.

Two openings 80 and 82 in the plate 30 have communication with the bore 44 by branch passages 84. Plate 30 is also provided with two openings 86 and 88 having communication with the bore 46 through the medium of branch passages 90. With the handle 28 positioned vertically, both openings 62 and 64 lie out of registration with all the openings 80, 82, 86 and 88. Rotation of the plate 30 to the position of Figure 3 brings the openings 86 and 82 into registration with the openings 62 and 64 in the stationary plate 16, at which time fluid from the pump 54 is pumped into the bottom end of the cylinder 70 for elevating the piston 72. At the same time, the liquid above the piston 72 flows back to the tank 52 through the medium of the hose 68. In rotating the plate 30 to the position of Figure 4, the openings 80 and 88 are respectively aligned with the openings 62 and 64 to place pump pressure in the upper end of the cylinder 70 to cause the piston 72 to descend. At the same time, the liquid in the lower end of the cylinder may flow back to the tank 52 through the medium of the hose 66.

In an installation where the device is employed for hoist purposes, as in connection with a dump truck, the pump 54 may be driven from the motor of the truck. The face of the plate 30 engaging the bottom face of the bore 34 provides a seal against leakage, since the spring 40 maintains the plate 30 in pressure engagement with the plate 16.

Without further elaboration, the foregoing will so fully illustrate my invention, that others may, by applying current knowledge, readily adapt the same for use under various conditions of service.

I claim:

1. A valve comprising a supporting body having a wall provided with a valve face and first and second ports passing through said wall and the valve face, a rotary member having a valve face engaging said first-mentioned valve face and provided with first and second passages, said rotary member being provided with branch passages communicating with said first passage and terminating in third and fourth ports passing through said second-mentioned valve face, said rotary member being provided with branch passages communicating with said second passage and terminating in fifth and sixth ports passing through said second-mentioned valve face, and means for rotating said rotary member, with said third, fourth, fifth and sixth ports also spaced on a common arc line concentrically of the axis of rotation of the rotary member as to bring the third and sixth ports into respective communication with said first and second ports in one position of the rotary member and the fifth and fourth ports into respective communication with said first and second ports in another position of the rotary member, said third, fourth, fifth and sixth ports being out of communication with said first and second ports in a third position of said rotary member.

2. The invention described in claim 1 wherein resilient means are interposed between said supporting body and said rotary member to hold said first- and second-mentioned valve faces in sealing engagement one with the other.

3. The invention described in claim 1 wherein said supporting body is provided with a cavity and in which said rotary member includes a flange, and a spring interposed between said flange and a wall face of said cavity to press said first- and second-mentioned valve faces into sealing engagement one with the other.

4. The invention described in claim 1 wherein said supporting body is provided with a cavity and in which said rotary member includes a flange, a spring interposed between said flange and a wall face of said cavity to press said first- and second-mentioned valve faces into sealing engagement one with the other, and a thrust bearing interposed between said spring and said wall face of the cavity.

5. The invention described in claim 1 wherein said supporting body includes a plate detachably connected therewith and having a recess, and in which said rotary member includes a flange having peripheral engagement with the wall of said recess, and in which said first-mentioned valve face is located on said plate and in which said second-mentioned valve face comprises one face of said flange.

6. A valve as set forth in claim 1, wherein the supporting body has a cavity and includes a plate having a circular recess and provided with said first and second ports, the circular wall of said recess constituting said first mentioned valve face; wherein the rotary member has one end extended through that wall of the cavity opposite said plate and is provided at its other end with a disk fitting in said recess with its periphery in contact with the annular wall of said recess, the disk carrying said fifth and sixth ports and said branch passages, one face of said disk contacting with the circular wall of said recess and constituting said second mentioned valve face; wherein the valve faces are held in contact by a coil spring sleeved upon the rotary member and contacting with said disk; wherein an antifriction bearing is mounted on said rotary member between the spring and said second wall of the cavity; and wherein an operating member for the rotary member is secured to the projecting end of the rotary member.

WILLIAM E. AGER.